United States Patent Office 3,397,679
Patented Aug. 20, 1968

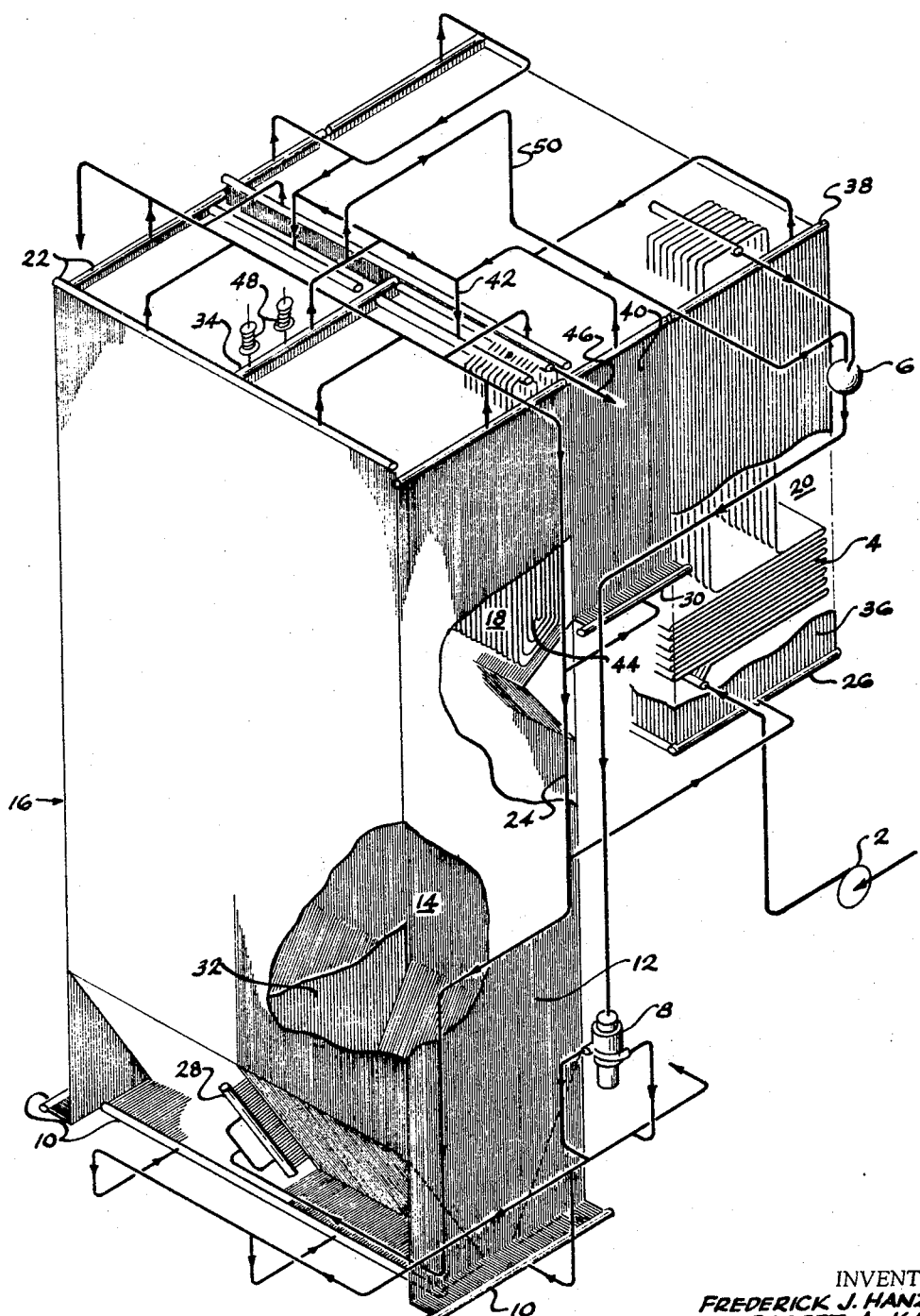

3,397,679
THROUGH-FLOW STEAM GENERATOR CIRCUIT
Frederick J. Hanzalek, Suffield, and Robert A. Kane, Hazardville, Conn., assignors to Combustion Engineering, Inc., Windsor, Conn., a corporation of Delaware
Filed Dec. 20, 1966, Ser. No. 603,219
5 Claims. (Cl. 122—406)

ABSTRACT OF THE DISCLOSURE

A supercritical steam generator having a furnace with tube lined walls and a tubular dividing wall. A flue conveynig combustion products from the furnace with the walls of the flue also lined with tubes. The water throughflow circuit is such that the water passes first through the tubes lining the furnace wall and then in parallel flow through the dividing wall and the tubes lining the flue walls.

Background of the invention

This invention relates to through-flow steam generators and in particular to a fluid flow circuit therefor.

In a once-through flow steam generator the flow passes serially through three major sections. First is the economizer which is located in a low gas temperature zone. Secondly the fluid passes through waterwall circuits surrounding the furnace and operating at a very high heat absorption rate. Finally the fluid is heated in a superheater which is located in a high gas temperature zone but generally remote from the intense radiation of the combustion zone. Since the low temperature economizer surface is relatively inexpensive as compared to the high temperature superheater surface, it would generally be less expensive to design a unit with substantial economizer surface and minimal superheater surface. The high heat absorption rates in the furnace walls, however, lead to extremely high metal temperatures and enforce a practical limit on the waterwall outlet temperature. This, in turn, limits the amount of economizer surface which may be used and similarly dictates the extent of the superheater surface.

Further problems arise when a division wall is installed within the furnace. If the division wall is placed in parallel with the outer walls, less flow obviously passes through the outer walls. Since the heat absorption of these walls is fixed, this produces a higher temperature difference through the wall and, accordingly, a higher temperature unbalance between various parallel tubes in light of the inherent heat absorption unbalances occurring. The mass flow of the water passing through these outer walls is also reduced under such an arrangement. If the division wall is located upstream of the outer walls, the full flow still passes through the outer walls. The outer wall, however, operates at the highest temperature of any of the furnace wall tubing, and the outer wall picks up a higher percentage of heat than the division wall. We therefore find that in this maximum temperature furnace circuit we have the highest heat absorption and therefore the maximum tube-to-tube temperature unbalances. Since we must design for the hottest tube that could occur during operation, this substantially limits the maximum design temperature of the average fluid leaving the furnace circuits.

As the fluid is heated in the furnace circuits, the specific volume of the water increases substantially, for instance, from 0.027 ft.$^3$/lb. at 680° F. to 0.110 ft.$^3$/lb. at 800° F. The high specific volume near the outlet is reflected in a high pressure drop for the same available flow area. If the division wall is located downstream of the outer walls, there is a tendency for high pressure drop in these division walls. Since there is substantially more wall surface available in the outer wall than in the division wall, the flow area of the division wall is reduced thereby aggravating the pressure drop situation. In attempting to overcome this high pressure drop situation, larger diameter tubes are often used in the division wall. These larger diameter tubes require thicker walls to restrain the pressure, and therefore the temperature drop through these tubular walls is increased. This, of course, results in a very high tubular metal temperature in the division wall circuit which is already operating at a very high fluid temperature.

In our invention after passing through the economizer, the fluid passes first through tubes lining the furnace walls. Tubes lining the flue which convey combustion products from the furnace are connected in parallel with tubes of the furnace division wall, and both of these circuits are located downstream of the outer wall circuits. More flow area is thereby provided for the high specific volume fluid so that pressure drop is reduced. Also the fluid leaving the outer walls is in a higher specific heat zone so that the temperature unbalance between various tubes is reduced in the outer walls. The division wall, having less heat absorption than the outer walls, has a lower enthalpy rise even though less flow is passing therethrough, and therefore there is less temperature unbalance between tubes of this division wall. The division wall need not necessarily extend into corners nor has it any layout problems such as those required for burner openings and for general furnace access. The division wall therefore can be designed to obtain a more uniform heat absorption distribution than the outer wall so that temperature unbalances in the division wall can be further reduced.

Since the division wall is heated on both sides rather than on just one side as in the case of the furnace outer walls, austenitic material can be more easily justified economically in the division wall. The division wall, being free from the structural limitations of the outer wall, can be designed to absorb the increased expansion due to using austenitic material. Superimposition of a recirculating system on the combined outer wall, division wall and flue wall circuits provides adequate distribution between the division wall circuits and the flue wall circuits at all loads.

Description of the preferred embodiment

Feedwater pump 2 supplies water at supercritical pressure to the economizer 4. The water passing through the tubular surface of the economizer is heated and then conveyed to the mixing vessel 6. From here the water passes downwardly through circulating pump 8 to the lower headers 10 of the furnace outer walls.

Outer wall tubes 12 line the walls of the furnace 14. Burners 16 fire fuel into the furnace with combustion products passing outwardly through the horizontal flue 18 and the vertical flue 20. Water passes upwardly through the outer furnace wall tubes 12 from the lower headers 10 to the outer wall outlet headers 22.

The fluid leaving the outer wall headers passes through pipe 24 with a portion of the water being conveyed to the lower flue wall headers 26 and the second portion being passed to the division wall headers 28. A third portion of this fluid is also conveyed to the horizontal flue wall header 30.

The division wall 32 is a panel-like structure with a plurality of tubes in a single plane. A portion of the fluid is conveyed upwardly through this division wall to the division wall outlet header 34. Vertical flue tubes 36 line the walls of the vertical flue and convey fluid upwardly along these walls from the inlet header 26 to the flue outlet header 38. Similarly horizontal flue wall tubes 40 are vertical tubes lining the wall of the horizontal flue 18 and operate to convey fluid upwardly from the inlet headers 30 to the flue outlet header 38.

The flow from the division wall outlet header 34 and the flue outlet headers 38 is combined in superheater inlet pipe 42 and conveyed to the superheater section 44, where the fluid is heated to a final steam temperature and passed outwardly to steam line 46.

The division wall and the flue walls are in parallel flow relation with respect to the steam generator fluid flow. Less than 75 percent of the through-flow is passed through the division wall so that the pressure drop is less than 60 percent of that which would occur had all the flow passed through the division wall. Since this division wall is being heated on both sides, the unit can be economically designed for high temperature leaving the division wall and austenitic material is used, although this is not essential. The upper division wall header is supported on springs 48 to allow for expansion differential between the austenitic division wall and the ferritic outer walls and also for the higher temperature level. Ferritic material is also used for the tubes lining the flue walls.

Since the head in the vertical heated portion of the tubes lining the flue walls and the head in the vertical heated portion of the division wall are substantially different, flow distribution problems can conceivably occur between these two sections at certain low flow conditions. As one method of avoiding this, recirculating line 50 is supplied, which permits recirculation from the outlet of these walls to the mixing vessel 6. A floating pump system of the type used here is more completely described in U.S. Patent 3,135,252 to W. W. Schroedter. This permits a high rate of flow to be maintained at all loads and, accordingly, a reasonable pressure drop through the parallel circuits thereby promoting the desired distribution of flow between the division wall and the tubes lining the flue walls. Even with recirculation the unit is of the through-flow type, since there is no intermediate steam drum which would fix the enthalpy at an intermediate location in the steam generator.

The full flow, whether it be only the through-flow, the recirculating flow or a combination of the two, is passed through the outer wall tubing of the furnace. The maximum heat absorption occurs in this circuit, being approximately 80 percent of the total heat absorbed in the furnace. The fluid is heated in the furnace walls to a temperature of about 755° F. having a relatively high specific heat of 6 B.t.u. lb.° F. Due to this high specific heat, the temperature unbalance between various tubes in the wall is minimized. Furthermore, since the outerwall is now operating at a relatively low temperature, the tubes may operate at higher stress levels, and therefore they may safely carry higher structural loads.

While only 75 percent of the total flow passes through the division wall, the heat absorption is only about 20 percent of the total so that the enthalpy rise per pound of fluid passing through the division wall is only about ⅓ that of the fluid passing through the outer walls. Even if the same heat absorption unbalance occurred on the division wall as on the outer wall, the enthalpy unbalance at the outlet would be less. Since the division wall is free of design limitations which aggravate the unbalance on the outer walls, the unbalance on heat absorption is even less than on the outer walls. This temperature being the maximum which occurs in the furnace, is the temperature which dictates the design temperature leaving the furnace with its concomitant effect on the amount of economizer and superheater surface required. The use of an austenitic division wall permits an even higher outlet temperature and therefore further savings in the amount of superheater surface required. The division wall tubing is 1½ inch O.D. and the outer wall tubing is 1¼ inch O.D. The avoidance of large diameter division wall tubes further permits low operating metal temperatures. While tube size may be selected as desired, our invention permits use of smaller tubing in the division wall than in prior art units.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A through-flow steam generator comprising: a vertically elongated furnace; means for burning fuel within the furnace; a flue for conveying gaseous combustion products from the furnace, including a vertical flue portion; an economizer section located in said flue; a superheater section in said flue; first vertical tubes lining the walls of the furnace; second vertical tubes forming a planular dividing wall within said furnace; third vertical tubes lining the walls of said vertical flue portion; means for passing a through-flow of water through said economizer and through said vertical tubes; means for conveying the through-flow of water from said vertical tubes to and through said superheater; characterized by: said second and third vertical tubes being in parallel flow arrangement with respect to the water flow; and said first vertical tubes being located upstream of said second and third vertical tubes with respect to water flow.

2. An apparatus as in claim 1 having also means for withdrawing a portion of the through-flow from a location downstream of said second and third vertical tubes and introducing said withdrawn portion to a location upstream of said first vertical tubes.

3. An apparatus as in claim 1 wherein said first and third tubes are of ferritic material and said second vertical tubes have at least a portion thereof of austenitic material.

4. An apparatus as in claim 1 wherein said second vertical tubes and third vertical tubes are proportioned such that said second vertical tubes carry less than 75 percent of the flow passing through said first vertical tubes.

5. An apparatus as in claim 1 wherein said flue also includes a horizontal gas flow portion; fourth vertical tubes lining the horizontal gas flow portion; said fourth tubes being connected in parallel with said second and third vertical tubes with respect to water flow.

References Cited

UNITED STATES PATENTS

| | | | |
|---|---|---|---|
| 3,172,396 | 3/1965 | Kane | 122—406 |
| 3,245,385 | 4/1966 | Koch | 122—406 |

CHARLES J. MYHRE, *Primary Examiner.*